United States Patent [19]

Fernz et al.

[11] Patent Number: 4,792,107

[45] Date of Patent: Dec. 20, 1988

[54] AIRSHIP TELESCOPIC BOOM

[75] Inventors: James A. Fernz; Claude W. Engelke, both of Wichita, Kans.

[73] Assignee: The Boeing Company, Seattle, Wash.

[21] Appl. No.: 891,302

[22] Filed: Jul. 31, 1986

[51] Int. Cl.⁴ .............................................. B64F 1/12
[52] U.S. Cl. .................................... 244/115; 244/161; 244/137.1
[58] Field of Search .................. 244/135 A, 115, 116, 244/161, 137 A, 137 R

[56] References Cited

U.S. PATENT DOCUMENTS

| | | | |
|---|---|---|---|
| 2,967,684 | 1/1961 | Kvecht | 244/135 A |
| 3,601,342 | 8/1971 | Piasecki | 244/137 A |
| 4,009,850 | 3/1977 | Hickey | 244/115 |
| 4,236,686 | 12/1980 | Barthelme | 244/116 |
| 4,349,837 | 9/1982 | Hinds | 244/161 |

FOREIGN PATENT DOCUMENTS

| | | | |
|---|---|---|---|
| 918196 | 2/1963 | Canada | 244/115 |
| 249311 | 7/1912 | Fed. Rep. of Germany | 244/116 |

Primary Examiner—Galen Barefoot
Attorney, Agent, or Firm—Finnegan, Henderson, Farabow, Garrett & Dunner

[57] ABSTRACT

An airship telescopic boom adapted for mounting on an airship for securing airship mooring lines when docking the airship. The boom may be used for the handling of a fuel line in the refueling of the airship, transferring of airship supplies and equipment, and similar applications. The boom reduces the requirement for a large ground crew and possible injury to related personnel.

9 Claims, 2 Drawing Sheets

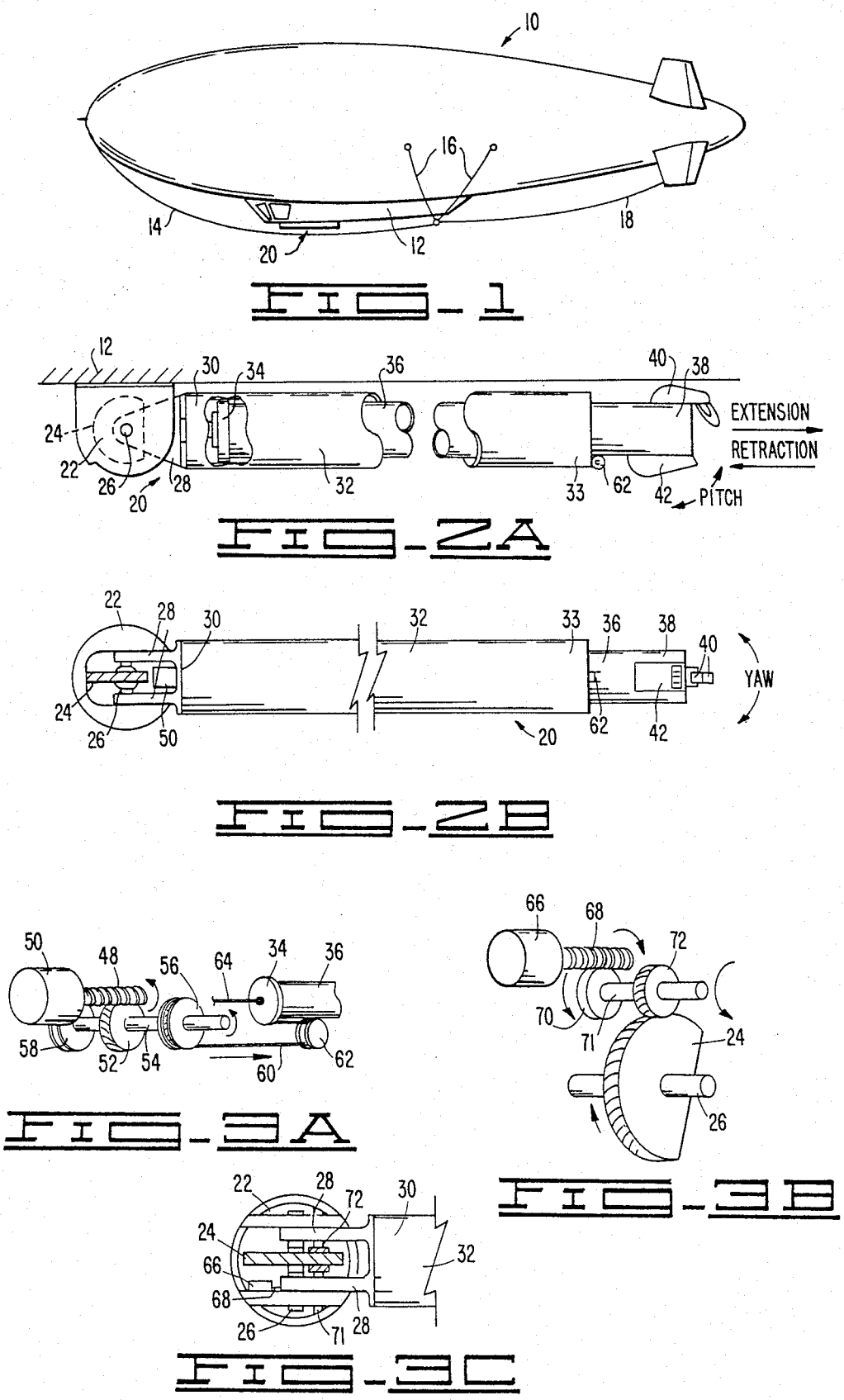

AIRSHIP TELESCOPIC BOOM

The U.S. Government has a paid-up license in this invention and the right in limited circumstances to require the patent owner to license others on reasonable terms as provided for by the terms of Contract No. N62269-85-C-0706 awarded by the Department of the Navy, Naval Air Development Center.

BACKGROUND OF THE INVENTION

This invention relates to a telescopic boom and more particularly, but not by way of limitation, to an airship telescopic boom adapted for mounting on an airship control car or hull of an airship.

Present airships rely upon mooring lines at the airship bow, stern and midship. The mooring lines are either attached to a vehicle by a ground crew or the ground crew is used to guide the airship to the airships mooring position.

The mooring system of airships has evolved over the past eight decades from a total ground crew of several hundred people to as few as six people. In the past the mooring systems used a stationary mooring mat, a traveling mooring mast, a weighted cart on railroad tracks for the aft mooring line and moving vehicles for midship mooring lines. However, all the systems as mentioned above relied on ground crew retrieval of the mooring lines and attachments to its connections.

Heretofore, there have been various types of airship anchoring devices as described in U.S. Pat. Nos. 1,949,888 to Statham, 1,957,285 to Oehmichen and 4,238,095 to Slater. None of the above-mentioned patents specifically describe the unique features and advantages of the subject airship telescopic boom.

SUMMARY OF THE INVENTION

The subject airship telescopic boom permits an airship telescopic boom operator on board the airship to connect the mooring lines to ground handling vehicles and masts using the telescopic boom.

The invention reduces the requirement of a large ground crew and possible personnel injury.

The airship telescopic boom can be used not only for securing airship mooring lines when docking the airship, but it can also be used for the handling of fuel lines in refueling the airship. Also, the telescopic boom can be used for handling airship supplies and equipment when loading and unloading equipment therefrom. Further the loading and unloading can be accomplished without mouring the airship.

The airship telescopic boom adapted for mounting on an airship includes a mounting plate for attachment to the airship. A tubular stationary arm is attached at one end to the mounting plate. An extension arm has one end slidably received in the other end of the stationary arm and is used for expansion and retraction in the stationary arm. The other end of the extension arm is used for mounting robotic fingers and a television camera for remote control in the handling of the mooring lines and similar applications. The stationary arm and extension arm include a cable driven extension system for extending and retracting the extension arm. Also, the two arms may be raised and lowered vertically in a pitch motion and laterally in a yaw motion.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1 is a side view of an airship with an airship control car mooring lines and the telescopic boom mounted thereon.

FIGS. 2A and 2B show a side and bottom view of the airship telescopic boom.

FIG. 3A illustrate the extension and retraction drive system for the boom.

FIGS. 3B and 3C illustrate the pitch drive system for raising and lowering he boom in a vertical position.

DETAILED DESCRIPTION OF THE DRAWINGS

Figure 3D:
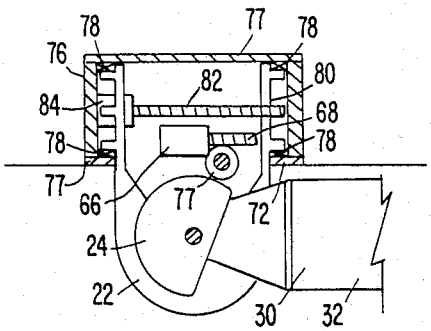
FIGS. 3D illustrate a side view of the pitch drive system.

In FIG. 1 an airship is shown and designated by general reference numeral 10. The airship 10 includes an airship control car 12, a forward mooring line 14, midship mooring lines 16 and an aft mooring line 18. Attached to the bottom of the airship control car 12 is the subject telescopic boom designated by general reference numeral 20. The telescopic boom 20 is controlled by a boom operator 21 located in the airship control car 12. The operator 21 is shown in FIG. 4A. The telescopic boom 20 can be extended and retracted along with being raised and lowered in a vertical or pitch motion. Also, the boom 20 may be moved in a lateral or yaw motion.

In FIG. 2A a side view of the boom 20 is shown having a mounting plate 22 with a gear 24 installed on a pivot shaft 26. A stationary arm pivot bracket 28 is pivotally attached to the shaft 26 and attached to a first end 30 of a stationary arm 32. The stationary arm 32 is tubular with a second end 33 receiving a first end 34 of an extension arm 36 therein. A second end 38 of the extension arm is used for mounting robotic fingers 40 thereon for use in gripping the mooring lines as shown in FIG. 1, a fuel line, or any other related applications. A television camera 42 is also mounted on the second end 38 of the extension arm 36 to permit the operator 21 to view the handling of the mooring lines on a TV monitor 46 shown in FIGS. 4A and 4B.

In FIG. 2B a bottom view of the telescopic boom 20 can be seen. The extension arm 36 is extended outwardly from the stationary arm 32 using a worm gear 48 driven by a drive motor 50. The worm gear shown in FIG. 3A engages a drive gear 52 mounted on a drive shaft 54 having a first cable drum 56 and a second cable drum 58. A first cable 60 is wound on the first cable drum 56 and around a pulley 62 mounted on the second end 33 of the stationary arm 32 and with the opposite end of the cable 60 attached to the first end 34 of the extension arm 36. A second cable 64 is attached at one end to the first end 34 of the extension arm 36 with the other end attached and wrapped around the second cable drum 58. By rotating the drive gear 52 in one direction the extension arm 36 is allowed to extend outwardly from the stationary arm 32 for telescoping the boom 20 during a mooring application. When the worm gear 48 drives the drive gear 52 in an opposite direction the second drive drum 58 wraps the second cable 64 therearound thereby retracting the extension arm 36 into the stationary arm 32 when the mooring application is completed and the telescopic boom 20 is maintained in its stored position as shown in FIG. 1. The drive motor 50, worm gear 48, and the drive shaft 54 with drums 56 and 58, are stored inside the first end 30 of the stationary arm 32.

In FIGS. 3B and 3C a pitch drive system is shown for raising and lowering the telescopic boom 20 in a vertical or pitch motion. The system includes a pitch drive motor 66 with worm gear 68 for driving a pinion gear 70. The pinion gear 70 drives a spur gear 72 mounted on a drive shaft 71. The spur gear 72 engages the pitch drive gear 24 mounted on the pivot shaft 26. By reversing the direction of the motor 66 and in turn the worm gear 68 the spur gear 72 rotates the drive gear 24 for in turn raising and lowering the telescopic boom 20 pivotally attached to the pivot shaft 26. The mounting plate 22 as shown in FIG. 2B is modified to include the pitch drive system in FIG. 3C.

Figure 3E:
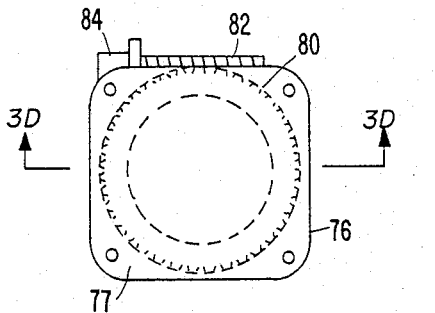
FIGS. 3E and 3F illustrate the yaw drive system for moving the boom in a lateral motion.
Figure 3F:
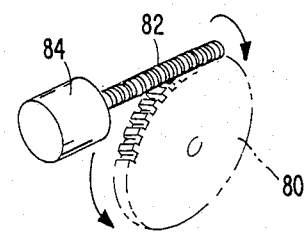

In FIGS. 3D, 3E and 3F the mounting plate 22 can be seen with an upper portion of the plate received in a mounting plate housing 76 and rotatably mounted thereon using a plurality of bearings 78 disposed therein. A cover plate 77 retains the mounting plate 22 and the bearings 78 in the housing 76. The upper portion of the mounting plate 22 further includes a yaw drive gear 80 which is engaged by a worm gear 82 driven in opposite directions by a yaw drive motor 84. When the pitch drive motor 66 lowers the telescoping boom 20 by engaging the pitch drive gear 24 the yaw drive motor 84 may be turned on for driving the yaw drive gear 80 and moving the telescoping boom 20 in a lateral or yaw motion.

Figure 4B:
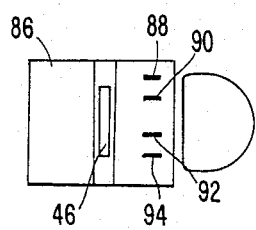
FIGS. 4A and 4B illustrate a side and top view of a telescopic boom operator console for operating the telescopic boom from the airship.
Figure 4A:
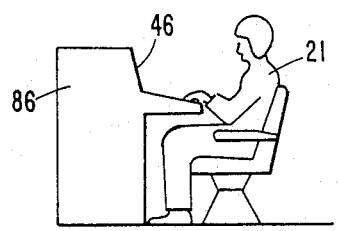

In FIGS. 4A and 4B the telescopic boom operator 21 can be seen operating a telescopic boom console 86 having the TV monitor 46 with a robotic control 88, a yaw control 90, pitch control 92 and extension control 94. By electrically operating these controls the telescopic boom 20 can be extended, raised and lowered in a vertical motion and moved laterally for operating the robotic fingers 40 used in manipulating the mooring lines when docking the airship 10 or releasing the mooring lines during takeoff. As mentioned above the telescopic boom 20 can also be used for handling of fuel lines and loading and unloading of equipment and airship supplies.

Changes may be made in the construction and arrangement of the parts or elements of the embodiments as described herein without depending from the spirit or scope of the invention defined in the following claims.

What is claimed is:

1. A telescopic boom for an airship, said boom comprising:
    a housing recessed in said airship, said housing having a vertical axis and an opening through the surface of said airship generally coaxial with said vertical axis;
    a mounting plate including an annular portion disposed in said housing for rotation about said vertical axis and an integral flange portion extending through the opening of said housing;
    a tubular arm having first and second axial ends, said first end being secured to said flange portion for pivotal movement about a horizontal axis perpendicular to said vertical axis;
    an extension arm having first and second ends and being coaxially disposed in said tubular arm for selective reciprocal, axial telescopic movement through the second end thereof;
    pulley means operatively disposed in said tubular arm proximate said first end thereof and operatively connecting said tubular and extension arms for reciprocally moving said extension arm;
    annular gear means fixed to the annular portion of said mounting plate;
    means in said housing operatively engaging said annular gear means for selectively rotating said mounting plate around said vertical axis;
    a gear fixed to the first end of said tubular arm for pivotal movement therewith;
    worm gear means disposed in said housing and operatively engaging said gear for selectively rotating said tubular arm about said horizontal axis; and
    means in said airship connected to said pulley means, rotating means and worm gear means for controlling the operation thereof to selectively extend, rotate and pivot said boom.

2. The boom of claim 1 wherein said pulley means comprises a drive gear fixed to a pair of drive pulleys, an idler pulley fixed for rotation in said tubular arm proximate the second end thereof, a first cable joining one drive pulley to the first end of said extension arm via said idler pulley, a second cable joining the other drive pulley to the first end of said extension arm, a worm gear engaging said drive gear, and a motor for selectively rotating said worm gear in one direction to extend said extension arm and in the other direction to extract said extension arm.

3. The boom of claim 1 also including annular bearings in said housing supporting said annular portion for rotation.

4. The boom of claim 1 wherein said rotating means includes a worm gear engaging said annular gear and a yaw drive motor for selectively rotating said worm gear to rotate said annular portion about said vertical axis.

5. The boom of claim 1 wherein said gear is a section of a circle disposed coaxially with said horizontal axis, the annular limits of said circle section defining the limits of movement of said boom about said horizontal axis.

6. The boom of claim 1 wherein said worm gear means comprises a worm gear engaging said gear and a pitch drive motor for selectively rotating said worm gear to move said boom about the horizontal axis.

7. The boom of claim 1 also including means fixed to the second end of said extension arm for selectively gripping objects.

8. The boom of claim 7 wherein said gripping means is connected to said controlling means for selective control thereof.

9. The boom of claim 7 also including means on the second end of the extension arm connected to said controlling means for providing a visual indication of objects being engaged by said gripping means.

* * * * *

UNITED STATES PATENT AND TRADEMARK OFFICE
CERTIFICATE OF CORRECTION

PATENT NO. : 4,792,107

DATED : December 20, 1988

INVENTOR(S) : JAMES A. FERNZ and CLAUDE W. ENGELKE

It is certified that error appears in the above-identified patent and that said Letters Patent is hereby corrected as shown below:

Column 1, line 24, change "mat" to --mast--;

Column 2, line 13, change "he" to --the--.

Signed and Sealed this

Sixteenth Day of May, 1989

Attest:

DONALD J. QUIGG

Attesting Officer

Commissioner of Patents and Trademarks